No. 630,168. Patented Aug. 1, 1899.
J. J. BERRIGAN.
CENTRIFUGAL CREAM SEPARATOR.
(Application filed Nov. 14, 1898.)
(No Model.)
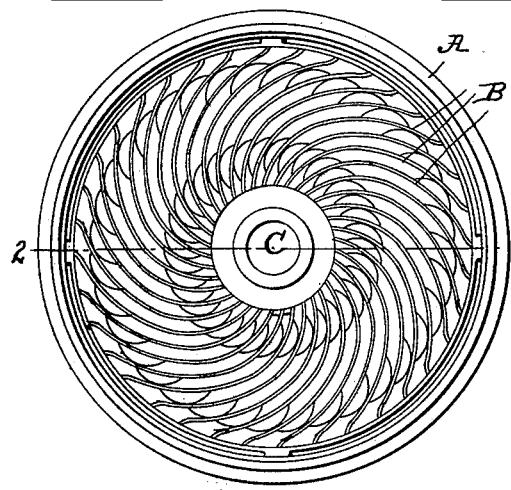
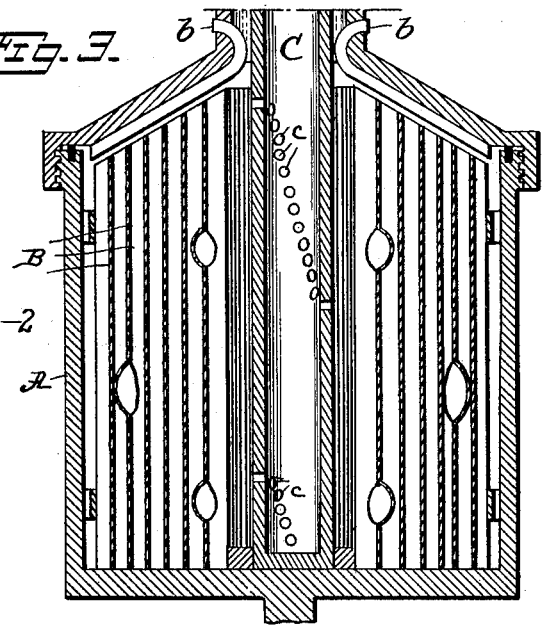
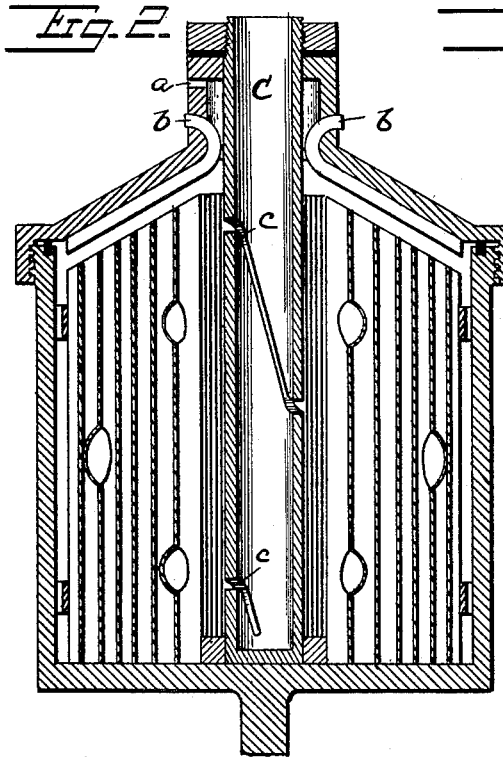
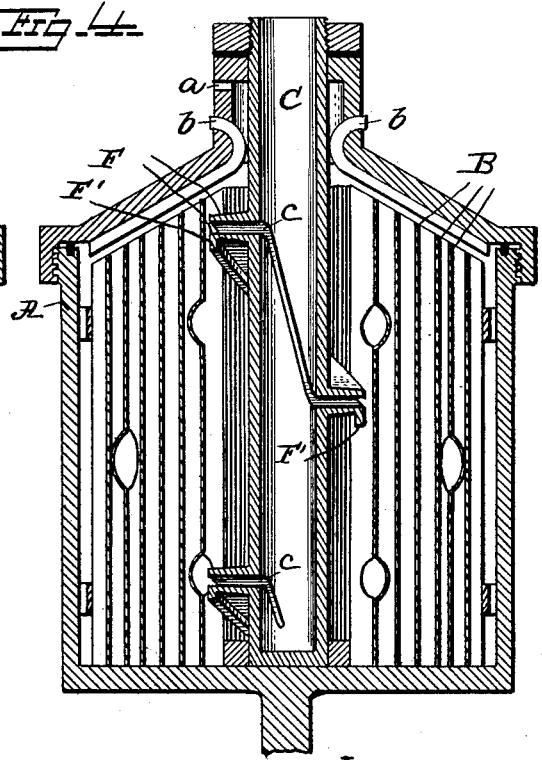
Witnesses:
Jesse B. Heller.
M. F. Ellis.
Inventor:
John Joseph Berrigan
Harding & Harding
Attorneys.

UNITED STATES PATENT OFFICE.

JOHN JOSEPH BERRIGAN, OF AVON, NEW YORK, ASSIGNOR TO THE DE LAVAL SEPARATOR COMPANY, OF NEW JERSEY.

CENTRIFUGAL CREAM-SEPARATOR.

SPECIFICATION forming part of Letters Patent No. 630,168, dated August 1, 1899.

Application filed November 14, 1898. Serial No. 696,359. (No model.)

*To all whom it may concern:*

Be it known that I, JOHN JOSEPH BERRIGAN, a citizen of the United States, residing at Avon, county of Livingston, and State of New York, have invented a new and useful Improvement in Centrifugal Liquid-Separators, of which the following is a full, clear, and exact description, reference being had to the accompanying drawings, which form a part of this specification.

My invention relates to that class of centrifugal liquid-separators in which there is in the liquid-space of the bowl a series of upright plates or blades which intersect the radial lines of the bowl. With this class of separators there is considerable difficulty encountered in providing for a proper distribution of the incoming milk between the blades or plates. This decreases the efficiency and capacity of the bowl. The difficulty arises as follows: The incoming milk is forced to enter the blades through the cream-wall or from their upper or lower ends and distribute itself downwardly or upwardly against the inward and outward action of centrifugal force.

The object of my invention is to provide means to evenly distribute the incoming milk throughout the length and height of these blades and evenly as to the different blades. I accomplish this in the following manner: The separator is provided with a central tubular shaft or core. I use this shaft for the entry of the full milk, but close or nearly close the same at its bottom, so that at most but a portion of the milk may escape therefrom, and provide it with a spiral or semi-spiral aperture extending around it. By this means the incoming milk is fed into the spaces between the blades at a low point into some of them, gradually higher into others, and up to almost the top of still others, &c. As will appear hereinafter, I do not intend to limit myself to any particular form of such shaft or core or any particular form of screw-like apertures or inlets used in the same. Thus, as will be seen, the inlet aperture or apertures may be cut in the intermediate wall of the shaft itself. In this case a greater part of the incoming milk will pass through the cream-wall in process of separation. Instead of cutting the spiral aperture directly in the intermediate wall of the shaft the shaft may be provided with a projecting flange spiral in form, in which and the wall of the shaft the inlet aperture or apertures may be cut. In this case the flange may project sufficiently to carry the inlet beyond the cream-wall, and thus the new milk will be delivered into the neutral zone—a decided advantage.

I will now describe the embodiment of my invention as illustrated in the accompanying drawings.

Figure 1 is a plan view of the bowl and plates with the cover removed. Fig. 2 is a section on the line 2 2 of Fig. 1. Figs. 3 and 4 are views similar to Fig. 2 of modified form.

A is the bowl of a centrifugal liquid-separator adapted for the separation of milk; $a$, the cream-outlet; $b$, the skim-milk outlet.

B are a series of upright blades or plates intersecting the radial line of the bowl in the liquid-space of the bowl.

C is a tubular shaft. In Fig. 1 there is shown a spiral or screw-like aperture $c$ extending from top to bottom of this shaft, the tubular shaft being closed at the bottom, although in practice if it is nearly closed, so that but a small portion of the milk may escape therefrom, it will be sufficient. The milk is fed into this tubular shaft and escapes through the spiral aperture. This spiral aperture may be, as shown in Fig. 1, a continuous aperture, or, as shown in Fig. 3, made up of a series of orifices. As may be seen in this form the full milk delivered into the bowl has to pass through the cream-wall in process of separation.

In Fig. 4 I have shown a construction in which a spiral or screw-like flange F projects from the tubular shaft, and through this and the inner wall of the shaft is cut the aperture. In this construction in order to form a channel or passage for the cream to its discharge-outlet I provide a flange F', depending from the flange F.

Wherever in the claims I use the term "aperture," I intend to include both a continuous aperture and one formed by a series of orifices.

Having now fully described my invention, what I claim, and desire to protect by Letters Patent, is—

1. In a centrifugal liquid-separator, in combination with a bowl provided with a plurality of upright plates, of a tubular shaft provided with an aperture extending from the interior to the exterior of said shaft, and extending spirally around and along said shaft.

2. In a centrifugal liquid-separator, in combination with a plurality of upright plates, of a tubular shaft provided with an outwardly-projecting flange, said flange extending spirally around and along the periphery of said shaft, there being an aperture cut through said flange and the wall of the tubular shaft, the aperture conforming in direction to the spiral flange.

3. In a centrifugal liquid-separator, in combination with a plurality of upright plates, of a tubular shaft provided with an outwardly-projecting flange, said flange extending spirally around and along the periphery of said shaft, there being an aperture cut through said flange, the aperture conforming in direction to the spiral flange and the wall of the tubular shaft, said outwardly-projecting flange being provided with a downwardly-projecting flange at its outer end.

In testimony of which invention I have hereunto set my hand, at Philadelphia, on this 30th day of September, 1898.

JOHN JOSEPH BERRIGAN.

Witnesses:
  CHAS. COBB VAN RIPER,
  M. F. ELLIS.